Nov. 9, 1948.                E. F. SARVER                 2,453,597
                  FITTING FOR PIPE OR HOSE CONNECTIONS
                        Filed Oct. 30, 1944
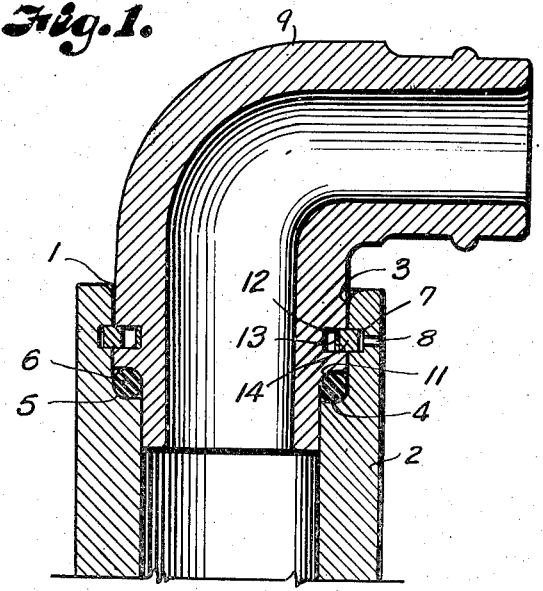
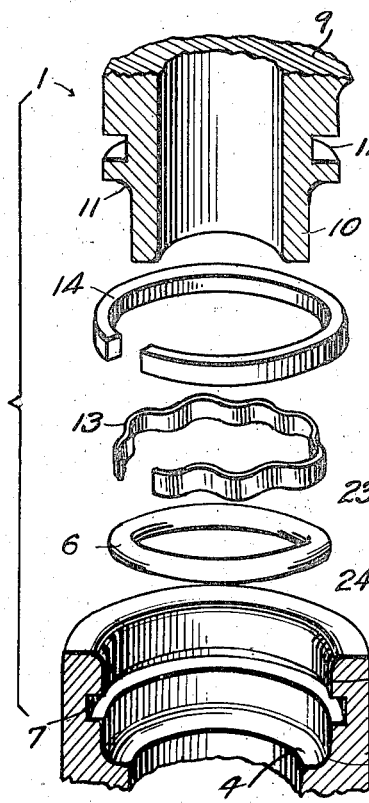
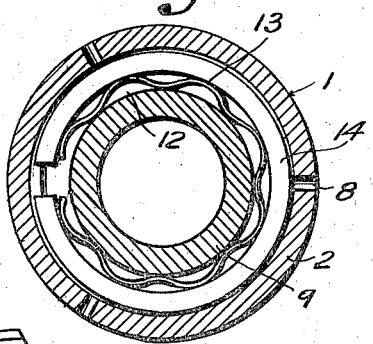
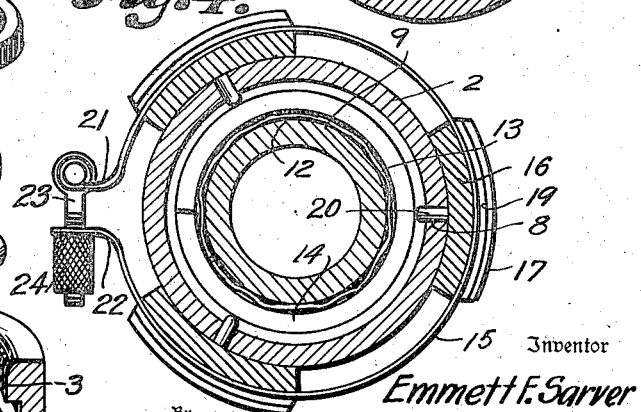
Inventor
Emmett F. Sarver
By Fishburn & Mullendore
Attorney Patented Nov. 9, 1948

2,453,597

UNITED STATES PATENT OFFICE 2,453,597

FITTING FOR PIPE OR HOSE CONNECTIONS

Emmett F. Sarver, Erie, Pa., assignor to Rohlm Manufacturing Company, Inc., Erie, Pa., a corporation of Kansas Application October 30, 1944, Serial No. 561,041

2 Claims. (Cl. 285—97.3)

This invention relates to fittings, and particularly to fittings which are adapted for use with either pipe or hose connections, or to a valve part or other device so that the fitting may be turned in any direction.

The principal objects of the invention are to provide a fitting and has flexibility; to provide a connection which will prevent vibration of the tubing to which the fitting is attached; to provide a fitting which may be quickly and easily assembled; to provide a fitting which will prevent damage to the equipment to which it is attached; and to provide a simple, relatively economical fitting and capable of efficient operation.

In accomplishing these and other objects of the invention I have provided improved details of structure, the preferred forms of which are illustrated in the accompanying drawing, wherein:

Fig. 1 is a vertical cross-sectional view of my invention showing the fitting in place.

Fig. 2 is a longitudinal cross-sectional view of my invention showing the parts in disassembled relation.

Fig. 3 is a transverse cross-sectional view of my device in assembled relation.

Fig. 4 is a view similar to Fig. 3, but additionally shows the resilient band for compressing the locking ring to disengage it from the socket element.

Fig. 5 is a cross-sectional view of a shoe on the resilient band for contracting the locking ring.

Referring more in detail to the drawings:

1 designates a fitting embodying the features of my invention, comprising a socket element 2 having a counterbore 3 providing an annular shoulder 4 rounded as at 5 and adapted to receive a gasket 6 preferably made of rubber or other resilient material. The counterbore of the socket element is provided with an annular groove 7 spaced above the shoulder 4. The socket element also has holes 8 extending through the wall thereof and intersecting the annular groove.

A fitting 9 having an annular pilot portion 10 is provided for insertion in the socket 2 so that the rounded shoulder 11 of the pilot will seat on the gasket 6 providing a seal between the fitting and socket element. The fitting 9 is also provided with an annular groove 12 of a size and location to register with the annular groove 7 in the socket element when the fitting is inserted therein. A split corrugated centering ring 13 preferably of spring material is provided to fit in the annular groove 12 so that the corrugations on one side press against the inner periphery of the groove 12 and the corrugations on the opposite side of the ring press against a split ring 14, also preferably made of resilient material provided for fitting in the annular grooves 7 and 12 for locking the fitting in the socket element as later described.

In assembling a device constructed as described, the gasket ring 6 is fitted on the annular shoulder 4 of the socket element. The split centering ring 13 is inserted in the groove 12 of the fitting and the locking ring 4 is then inserted thereover. The locking ring is then contracted by any suitable means, such as a metal sleeve, until its periphery is flush with the periphery of the fitting 6. The fitting assembly is then inserted into the socket element until the shoulder 7 comes in contact with the gasket 6 forming a compression seal between the fitting and socket element and the locking ring snaps outwardly into the annular groove 8 in the socket element. The centering ring 3 will exert pressure on the inner side of the locking ring to hold the ring in an extended position as shown in Fig. 3 securely locking the fitting in the socket element until it is desired to be released as presently described.

In order to remove the fitting 9 from the socket element 2 I provide a tool consisting of a resilient band 15, Fig. 4, provided with a plurality of shoes 16. The shoes may be made of any suitable material and preferably have inturned flanges 17 and 18 on their outer side forming a groove 19 for retaining the resilient band 15 therein. The shoes are provided on their inner faces with inwardly extending pins 20 adapted to be inserted in the holes 8 in the groove 12 of the socket element so that the pins may contact the locking ring upon contraction of the resilient band.

The resilient band 15 is provided with outwardly extending ears 21 and 22 having openings therein and adapted to receive an eye bolt 23 having a nut 24. Tightening of the nut 24 will compress the resilient band 15 exerting pressure on the shoes 16 so that the pins will exert pressure on the locking ring 14 and compress same to disengage it from the annular groove 7 in the socket element so that the fitting 9 may be removed therefrom. The shoes 16 are loosely applied to the resilient band 15 so that there will be no binding when the band is compressed to apply pressure thereto.

From the foregoing it will be obvious that I have provided an improved fitting simple, economical and capable of operating in an efficient manner.

I claim:

1. A swivel pipe fitting including complementary male and female tubular members, the female member having at one end an enlarged socket forming an annular shoulder at the inner end of said socket, an annular groove around the inner periphery of the socket in spaced relation to the shoulder, a compressible gasket ring adapted to seat on the annular shoulder in the socket, the male tubular member having a portion shaped to fit and enter the socket, a pilot on said male member shaped to fit and extend into the female tubular member beyond the annular shoulder in the socket, an annular ledge being provided around the periphery of said male member between the pilot and the portion fitting in the socket, said ledge engaging the gasket ring, an annular groove around the outer periphery of the male member in spaced relation to the ledge and adapted to mate with the annular groove in the socket when the gasket ring is compressed between the shoulder and the ledge of the respective members, and a split retaining ring of a size to enter the socket when compressed in the groove of said male member and of a thickness greater than the depth of the groove in the socket into which it is adapted to expand to engage both of said grooves for retaining the tubular members together with a sealed joint and permit relatively rotary motion of said members.

2. A swivel pipe fitting including complementary male and female tubular members, the female member having at one end an enlarged socket forming an annular shoulder at the inner end of said socket, an annular groove around the inner periphery of the socket in spaced relation to the shoulder, a compressible gasket ring adapted to seat on the annular shoulder in the socket, the male tubular member having a portion shaped to fit and enter the socket, a pilot on said male member shaped to fit and extend into the female tubular member beyond the annular shoulder in the socket, an annular ledge being provided around the periphery of said male member between the pilot and the portion fitting in the socket, said ledge engaging the gasket ring, an annular groove around the outer periphery of the male member in spaced relation to the ledge and adapted to mate with the annular groove in the socket when the gasket ring is compressed between the shoulder and the ledge of the respective members, a split retaining ring of a size to enter the socket when compressed in the groove of said male member and of a thickness greater than the depth of the groove in the socket, and a spring ring engaging the inner surface of said retaining ring for expanding same to engage both of said grooves for retaining the tubular members together with a sealed joint and permit relative rotary motion of said members.

EMMETT F. SARVER.

REFERENCES CITED

The following references are of record in the file of this patent:

UNITED STATES PATENTS

| Number | Name | Date |
| --- | --- | --- |
| 1,771,949 | Blanchard | July 29, 1930 |
| 2,238,706 | Ohls | Apr. 15, 1941 |

FOREIGN PATENTS

| Number | Country | Date |
| --- | --- | --- |
| 742,141 | France | Dec. 21, 1932 |